United States Patent [19]
Keller et al.

[11] Patent Number: 6,141,622
[45] Date of Patent: *Oct. 31, 2000

[54] SEISMIC SEMBLANCE/DISCONTINUITY METHOD

[75] Inventors: David Keller, Missouri City, Tex.; Darrell L. Kramer, Lafayette, La.

[73] Assignee: Union Oil Company of California, El Segundo, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/751,144

[22] Filed: Nov. 15, 1996

[51] Int. Cl.$^7$ .................................................. G06F 19/00
[52] U.S. Cl. .......................................................... 702/16
[58] Field of Search .................................. 702/13, 12, 14, 702/17, 18, 16

[56] References Cited

U.S. PATENT DOCUMENTS

| | | |
|---|---|---|
| 3,568,143 | 3/1971 | Naquin ................................... 340/15.5 |
| 3,597,727 | 8/1971 | Judson et al. .......................... 340/15.5 |
| 3,599,175 | 8/1971 | Hollingsworth et al. ....... 340/15.5 AC |
| 3,614,623 | 10/1971 | McAuliffe ................................ 325/42 |
| 3,638,178 | 1/1972 | Stephenson ............................. 340/15.5 |
| 3,931,609 | 1/1976 | Anstey ..................................... 340/15.5 |
| 4,048,612 | 9/1977 | Lawyer ..................................... 340/15.5 |
| 4,203,161 | 5/1980 | Johnson et al. ........................... 367/40 |
| 4,403,312 | 9/1983 | Thomason ................................. 367/56 |
| 4,460,059 | 7/1984 | Katz .......................................... 181/102 |
| 4,479,205 | 10/1984 | Gray .......................................... 367/74 |
| 4,503,527 | 3/1985 | Pann .......................................... 702/17 |
| 4,570,246 | 2/1986 | Herkenhoff et al. ...................... 367/74 |
| 4,672,545 | 6/1987 | Lin et al. ................................. 364/421 |
| 4,691,306 | 9/1987 | Arens et al. ................................ 367/40 |
| 4,729,101 | 3/1988 | Hanson et al. .......................... 364/421 |
| 4,779,237 | 10/1988 | Bodine ...................................... 367/47 |
| 4,799,201 | 1/1989 | Nelson ...................................... 367/41 |
| 4,800,539 | 1/1989 | Corn et al. ................................ 367/42 |
| 4,809,240 | 2/1989 | Mufti ........................................ 367/72 |
| 4,866,659 | 9/1989 | Lin et al. ................................. 364/421 |
| 4,894,807 | 1/1990 | Alam et al. ............................... 367/15 |
| 4,984,220 | 1/1991 | Bodine et al. ............................. 367/68 |
| 5,008,861 | 4/1991 | Gallagher ................................... 367/59 |
| 5,012,453 | 4/1991 | Katz ........................................ 367/57 |
| 5,047,933 | 9/1991 | Harita et al. ........................... 364/421 |
| 5,058,079 | 10/1991 | Wright et al. ............................. 367/59 |
| 5,226,019 | 7/1993 | Bahorich ................................... 367/74 |
| 5,563,949 | 10/1996 | Bahorich et al. ....................... 364/421 |
| 5,671,136 | 9/1997 | Willhoit, Jr. ............................ 364/421 |
| 5,838,564 | 11/1998 | Bahorich et al. ....................... 364/421 |
| 5,930,730 | 7/1999 | Marfurt et al. ........................... 702/16 |

OTHER PUBLICATIONS

*The Leading Edge*, Oct. 1995, vol. 14, No. 10, "The Coherence Cube", pp. 1053–1058.

AAPG, American Association of Petroleum Geologists Explorer, Sep. 1995, "Coherence Cube", 6 pages.

Coherence Technology Company, "Reveal Your Channels and Your Faults", advertisement in Leading Edge, Oct. 1995.

Seismic Sequence Attribute Map (SSAM), Michael S. Bahorich, "Case Histories 1: Seismic Stratigraphy", Society of Exploration Geologists, Winter Conference, New Orleans, Oct. 26, 1992, pp. 227–230.

"Access Survey", Marketing Brochure, Seismograph Service Corporation, 10 pages, 1983.

Neidell et al., "Semblance and Other Coherency Measures for Multichannel Data," Geographics, vol. 36, No. 3 (Jun. 1971) pp. 482–497.

*Primary Examiner*—Donald E. McElheny, Jr.
*Attorney, Agent, or Firm*—Gregory F. Wirzbicki; William O. Jacobson

[57] ABSTRACT

A semblance attribute to more reliably detect a seismic discontinuity is provided. The semblance attribute of the center point of a seismic volume is calculated from 3D traces within a spatial and time window. The seismic attribute is dependent, at least in part, on the ratio of the square of the sum of the amplitudes of said traces within the window and the sum of the squared amplitudes of said seismic traces over within the window.

20 Claims, 7 Drawing Sheets

Figure 4a: Standard amplitude time slice display at 2000 ms.

Figure 4b: CTC® cube display time slice at 2000 ms.

Figure 4c: Semblance attribute display time slice at 2000 ms.

SEISMIC SEMBLANCE/DISCONTINUITY METHOD

FIELD OF THE INVENTION

This invention relates to signal processing methods and devices. More specifically, the invention relates to seismic exploration methods identifying underground structures which are likely to indicate the presence of or contain recoverable natural resources.

BACKGROUND OF THE INVENTION

When exploring for natural resources located in or near underground strata or other underground structures, the use of vibrators, shock generators, geophones, hydrophones, and similar devices to act as seismic signal generators and/or receivers is well known to those skilled in the art. Generated seismic waves are typically reflected from geologic structural features and the reflected waves are analyzed to locate each reflecting feature. If multiple seismic sources and receivers are used to generate three dimensional seismic data using these devices, processing this data can require extensive computer resources and complex software to identify underground structures that may indicate zones where wells should be drilled to recover natural resources such as oil or natural gas.

Prior art processing methods have attempted to correct, time shift, amplify, filter, noise attenuate, or otherwise enhance seismic-derived displays representing underground structural features. For example, a recent signal processing method as described in U.S. Pat. No. 5,563,949 issued on Oct. 8, 1996 divides an underground volume into cells and obtains a cross-correlation measure. However, these prior art processing and display methods are costly, require extensive computer processing/storage capabilities, and have inherent limitations.

SUMMARY OF THE INVENTION

Such prior art signal processing and display methods can be improved by providing an inverse semblance attribute to more reliably detect two and three-dimensional discontinuity features at a lower data processing cost. In one embodiment, the semblance attribute of the center point of a seismic volume is calculated from seismic traces within spatial and time windows. By translating or slipping the center point of the volume, iterative calculations of the semblance attribute can be used to create a visualization of a series of seismic volumes. The preferred seismic attribute is dependent, at least in part, on the ratio of the square of the sum of the amplitudes of said seismic data at a time (t) over a specified window and the sum of the squared amplitudes of said seismic data over the same specified time window.

BRIEF DESCRIPTION OF THE DRAWINGS

In these Figures, it is to be understood that like reference numerals refer to like elements or features.

DETAILED DESCRIPTION OF THE INVENTION

Data processing of a spatial grid of seismic signals recorded by a sensor and processed over a limited time is well known by those skilled in the art to represent an underground geologic image volume, called a three dimensional (3D) seismic volume. The semblance attribute or operator of the invention is calculated from a limited number and portions of seismic traces within time and spatial windows. Output traces are produced at spaced apart centers or trace bin locations over a specified time window from this 3D seismic volume. The spatial window is defined using a limited number of trace bin locations. The time window further limits seismic data used to determine the semblance attribute. In the preferred embodiment, semblance attributes are derived from 5, 7 or 9 trace configurations or operators within a specified spatial window, but a smaller or larger number of trace operators is also possible. The seismic bin locations may be represented as projected points on orthogonal lines on a surface, e.g., a top or plan view of a seismic grid pattern. Most preferably, the semblance operator is produced from selected patterns of evenly spaced trace bin centers as shown in FIGS. 1a through 1d.

Figure 1A:
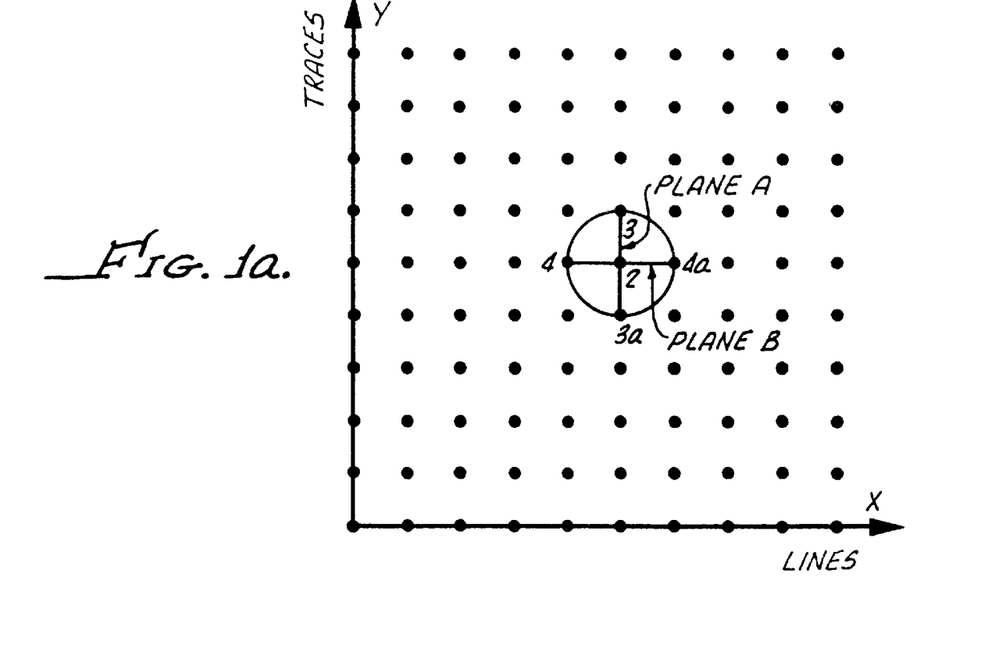
FIGS. 1a, 1b, 1c, and 1d show schematic representations of different spatial window patterns.

FIG. 1a shows a schematic top or plan view representation of a five point spatial windowing of seismic data (with the window represented by a circle) obtained from five seismic bin locations, with the bin locations represented as dots and the window-center seismic bin location 2 being located in planes "A" and "B". Planes "A" and "B" are shown substantially orthogonal to each other and substantially parallel to the Y and X axes, but other embodiments of the invention may use patterns producing lines at 60 degree or other angles from each other. Seismic bin locations 3 or 3a are located in a Trace (or Y) direction adjacent to seismic bin location 2 in either an upward positive or downward negative direction from seismic bin location 2. Seismic bin locations 4 or 4a are located in a Line (or X) direction adjacent to seismic bin location 2. The orthogonal grid pattern of seismic bin locations is typical of three dimensional (3D) seismic patterns and is well known to those skilled in the art, but two-dimensional (2D) linear bins (e.g., in a marine environment), non-linear arrangements, and other configurations or patterns are also possible.

Figure 1B:
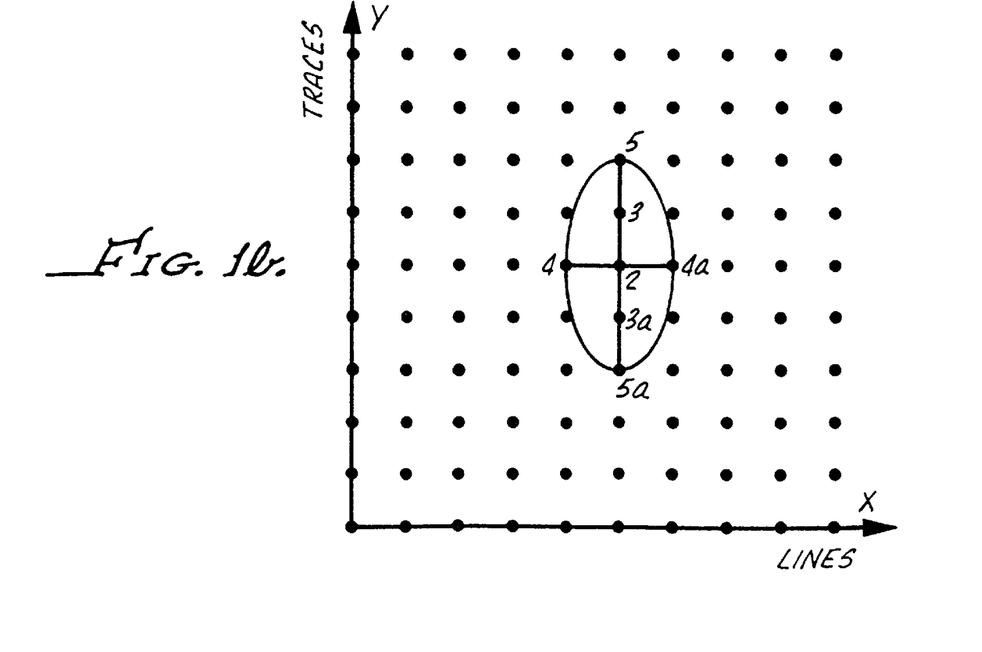

FIG. 1b shows a schematic top or plan view representation of a seven point spatial windowing of seismic data, with seismic bin location 2 being centrally positioned. Seismic bin locations 3, 3a, 5 and 5a are located in a Trace or Y) direction either an upward positive or downward negative direction from seismic bin location 2. Seismic bin locations 4 and 4a are located in a Line (or X) direction adjacent to seismic bin location 2. The major axis may also be located in the X direction as shown in FIG. 1d.

Figure 1C:
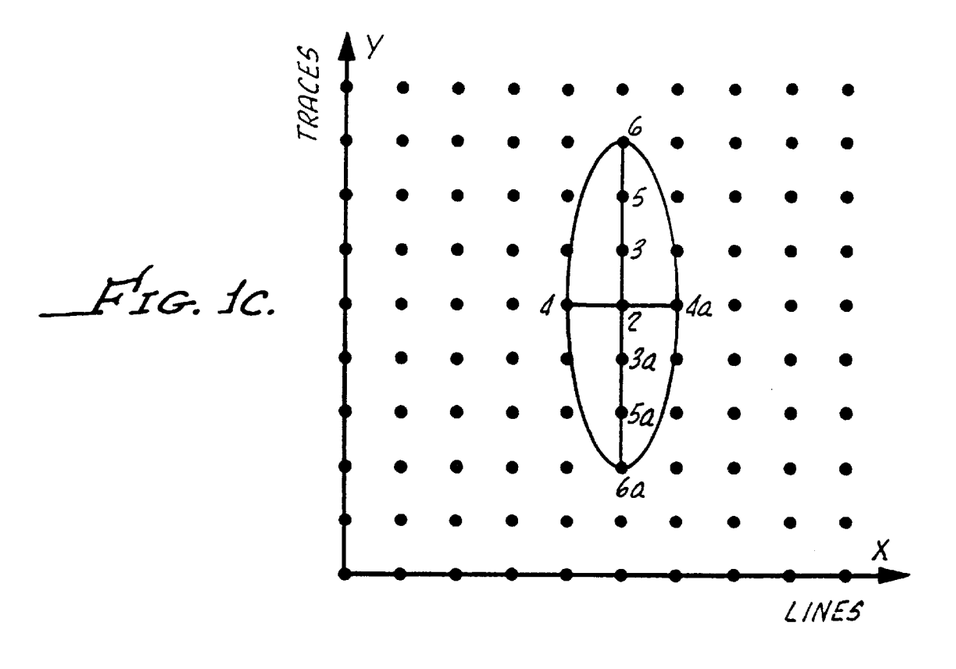

FIG. 1c shows a schematic top or plan view representation of a nine point spatial windowing of seismic data, with seismic bin location 2 again being centrally located. Seismic bin locations 3, 3a, 5, 5a, 6 and 6a are located in a Trace (or Y) direction in either an upward positive or downward negative direction from seismic bin location 2. Seismic bin location 4 and 4a are located in a Line (or X) direction adjacent to seismic bin location 2. The major axis may also be oriented in the X direction.

Figure 1D:
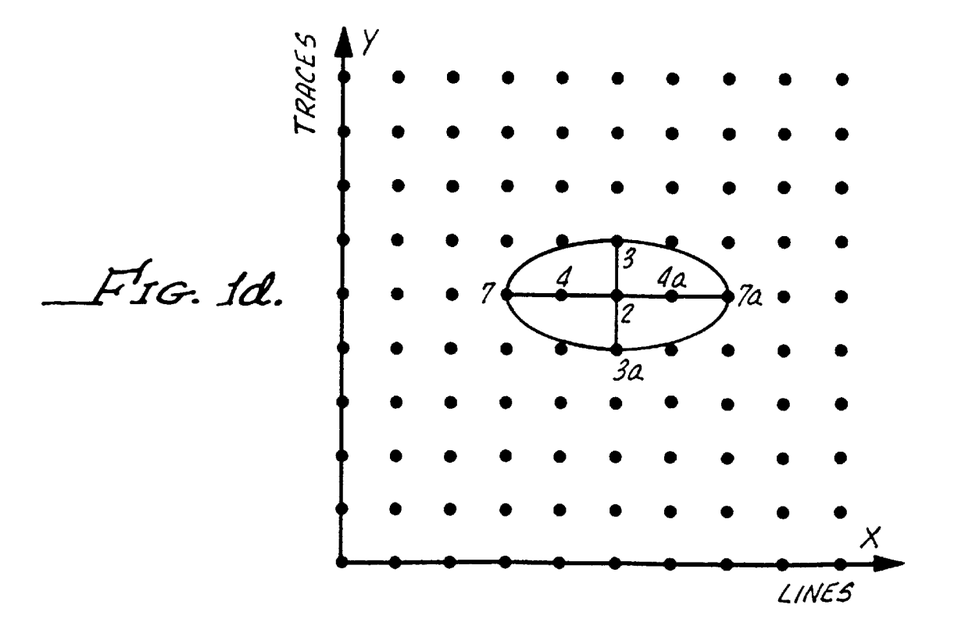

FIG. 1d shows a schematic top or plan view representation of a seven point spatial windowing of seismic data, with seismic bin location 2 being centrally located. Seismic bin location 3 and 3a are located in the Trace (or Y) direction adjacent to seismic bin location 2 in either an upward positive or downward negative direction from seismic bin location 2. Seismic bin locations 4, 4a, 7 and 7a are located in the Line (or X) direction symmetrically spaced apart from seismic bin location 2.

The circle or ellipse shown on FIGS. 1a through 1d indicate a selected spatial window option, i.e., that of a 5, 7, or 9 point pattern. These window pattern selections are only illustrative since an infinite number of other patterns could be used. For example, other 5,7, or 9 point patterns could be drawn at various angles rather than the ones shown.

The orientation of the preferred seismic bin sample locations can either all be in a Trace (in-line) direction, all in a Line (cross-line) direction, or in both directions as shown in FIGS. 1a through 1d. If both directions are specified, the sum of the in-line and cross-line semblance attributes within a seismic volume is output.

Figure 2:
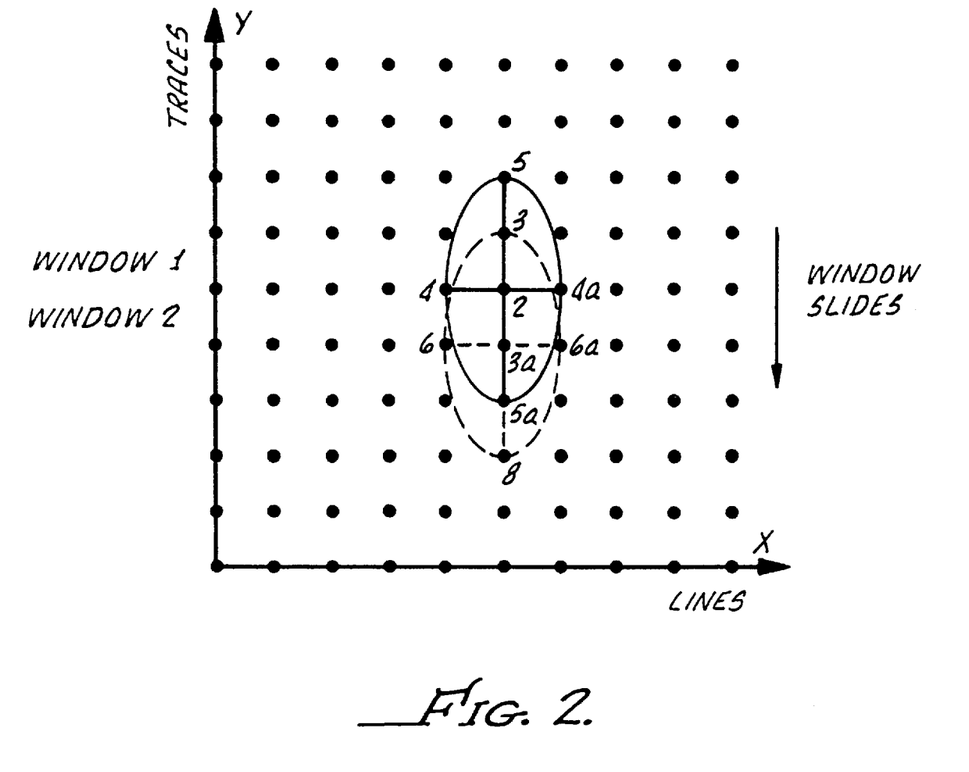
FIG. 2 shows a schematic representation of an initial spatial or temporal window and a subsequent spatial window slid or displaced from the initial spatial window.

FIG. 2 shows a spatial window location and the window shifted in the Trace or Y direction. Time samples within a spatially windowed seismic trace are also contained by the window. In the embodiment shown, the center point of the window is shifted one trace location in the negative Y-direction and the semblance analysis process repeated. This iterative shifting and analysis process continues until a user specified end location or the edge of the 3D seismic grid pattern is reached or the end of a seismic trace is reached. As shown in FIG. 2, the output sample within the starting "window 1" location which includes traces from locations 2, 3, 3a, 5, 5a, 4 and 4a. After sliding to the next window location, "window 2", the next output sample shifts the center point to 3a and includes traces from locations 2, 3, 5a, 8, 6 and 6a.

As shown in FIG. 2, the shifted location of a window is not necessarily spaced apart from the prior window. In other words, each trace (within a given spatial and time window) can be used to derive components of several different semblance attributes for seismic volumes that overlap each other. Seismic volumes or windows may also "touch" each other (e.g., have one common edge or trace) or may be spaced apart (having no common traces) as well as include traces in a single line or other patterns instead of the orthogonal cross-line pattern shown.

Time window shifting is accomplished by shifting or incrementing (up or down) the time window chosen, e.g., the traces within the time window representing a deeper or shallower 3D seismic volume. In the preferred embodiment, the seismic bin locations are located substantially vertically above the 3D geologic volume of interest. The sensed signals typically represent the first reflection of a seismic pulse from a geological interface. The seismic pulse is typically generated at the surface and is downwardly directed. By selecting a small time window, double reflections, first reflections from more distant seismic interfaces, and other undesirable signals can be minimized. The time window can be shifted until a user specified end time or other limit is reached.

A program application to calculate the semblance attribute has been created. The application calculates a semblance attribute using spatial windows (operators) parallel to the survey x-axis and parallel to the survey y-axis.

Possible operator configurations include 3 point, 5 point or 7 point in-line with 3, 5 or 7 orthogonal points. For an operator having more points in one plane than another (bias), the operator bias direction may be in-line, cross-line or in both directions. In the case where the operator is applied in two orthogonal directions, the sum of the x-pass and y-pass is output. The program application runs in a visualization or seismic software such as Landmark® SeisWorks® 3D application, version 2.3.2, supplied by Landmark Graphics Corporation located in Houston, Tex., USA.

The semblance attribute is used to identify seismic event continuity. The mathematical inverse of the semblance attribute can be calculated to identify seismic event discontinuity in 3D seismic surveys, e.g., a fault, strata, or fluid boundary. An inverse semblance value is assigned to the center of the spatial and time window for each point in the 3D seismic volume then output to the visualization or seismic software. Using one or two spatial dimensional calculations (and one or more times at each seismic volume center point) of a semblance attribute and/or its inverse, improved discrimination of underground structures (over prior art methods) is possible.

The program application prompts for the following inputs (supplying some default values if none is input):
project name;
spatial operator (e.g., number of major axis traces);
orthogonal operator (e.g., number of minor axis traces);
bias ((e.g., orientation of Line, Trace or both directions;
input file identifier;
output file identifier;
output file format (e.g., 8 bit or 32 bit);
starting Line location;
ending Line location;
starting Trace location;
ending Trace location;
start time;
end time; and
length of semblance time window.

The preferred semblance attribute, $S_{tij}$, is dependent at least in part on the ratio of the square of the sum of the amplitudes of the spatial window of seismic data within a time window to the sum of the squared amplitudes of the seismic data within the spatial and time windows. Most preferably, the semblance attribute at spatial location Line j and Trace i at time t, $S_{tij}$, is given by $$S_{tij} = \frac{\sum_{t-n\Delta t}^{t+n\Delta t}\left[\sum_{i-m\Delta i}^{i+m\Delta i}\sum_{j-p\Delta j}^{j+p\Delta j} x_{tij}\right]^2}{\sum_{t-n\Delta t}^{t+n\Delta t}\left[\sum_{i-m\Delta i}^{i+m\Delta i}\sum_{j-p\Delta j}^{j+p\Delta j} (x_{tij})^2\right]}$$

where;
n is one half the number of samples in the semblance time window,
m is the one half the number of samples in the in-line spatial window,
p is one half the number of samples in the cross-line spatial window, and
$x_{tij}$ is the amplitude at time t of a contributing trace at spatial location i, j.

The output inverse semblance values are then normalized for the data volume to a range between +127 and −128 for an 8 bit display. The normalization range for a 32 bit display range is between 2.147 E9 and −2.147E−9.

Several display enhancement options are also provided. One enhancement allows multiple (up to three) time ranges within which a different semblance time window (n points) may be calculated. Another enhancement allows the semblance attribute to be calculated over a range of times centered about a datum, e.g., a datum determined by an interpreted seismic event horizon.

Figure 3:
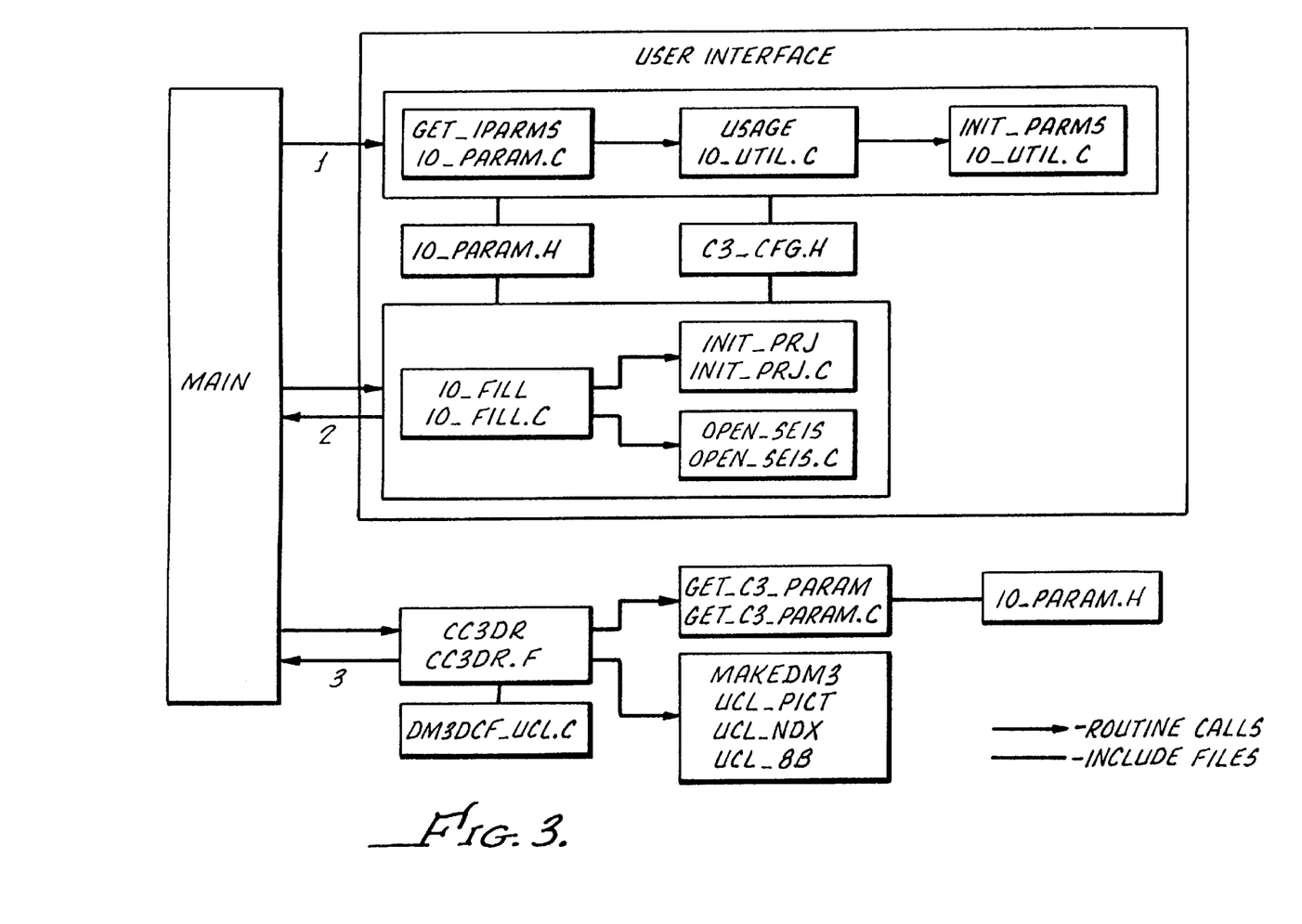
FIG. 3 shows a flow chart of a program application of the invention.

FIG. 3 shows a flow chart of a program application using the seismic or visualization software provided by Landmark Graphics Corp. The main driver routine (labeled as "Main") provides the interface to the remainder of the visualization software. Inputs to (interface with) the program application are labeled as "User Interface." User interface routines include: "get_iparms"(file io_param.c) which gets input values via command-line qualifiers, "io_param.h" which sets structure for input parameters, "c3_cfg.h" which activates input parameter variable flags, usage, and calls "init_parms" (file io_util.c) to provide help information, set input defaults, and initialize input parameters.

The user interface also includes "io_fill" (file io_fill.c) which gets parameters still needed by prompting the user. The project is initialized by calling "init_prj" (file init_prj.c) and opens the seismic files using open_seis (file open_seis.c).

The main processing routine, "cc3dr"(file cc3dr.f), calculates a normalized two dimensional inverse semblance attribute; and calls the "get_c3_param" (file get_c3_param.c) routine to get input parameters from the 3D seismic volume, the "makedm3" (in-line to cc3dr.f) routine to create/open an output 3dv file, the "ucl_pict" (in-line to cc3dr.f) routine to plot a graphical description of the seismic traces requested as input to the semblance operator, the "ucl_ndx" (in-line to cc3dr.f) routine to the implement the appropriate 5, 7 or 9 point operator with bias direction included, and the "ucl 8b" (in-line to cc3dr.f) routine to transform the normalized inverse semblance values to 8 bit integers ranging from −128 to +127.

New applications can be added to the main program application. New applications will generally require the addition of new subroutines and may require renaming program files in addition to selecting application specific parameters. The remainder of the visualization software may also require modifications for new applications.

Testing and use of the preferred embodiment of the semblance attribute application has shown it to be highly effective in identifying underground structures of interest, particularly structures that could trap oil and gas deposits. The invention is further described by the following example which is illustrative of a specific mode of practicing the invention and is not intended as limiting the scope of the invention as defined by the appended claims. The example is derived from testing of the seismic semblance attribute process on 3D seismic survey data from a project done near Intercoastal City in South Louisiana.

EXAMPLE 3D seismic survey data was transferred to a SeisWorks® compatible file, migb01.3dv and an output file identified, ci728b01.3dv. A seven point operator was chosen that is comprised of five points biased along the trace direction and two orthogonal points. A 3D subset of the volume was chosen. The starting line and ending line locations was 100 to 300, respectively. The starting trace location was 140 and the ending trace location was 340. Minimum time to calculate the semblance attribute was set at 0 and the maximum time to calculate the semblance attribute was set at 6000 ms. The length of the semblance time window selected was 72 ms.

Figure 4A:
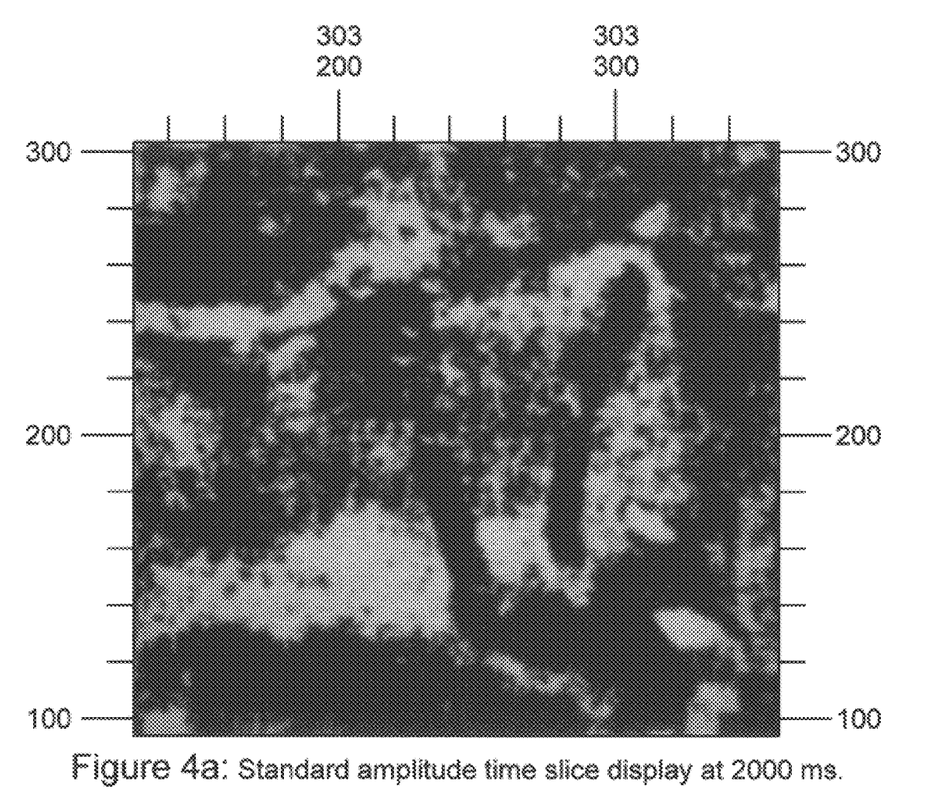
FIG. 4a shows a display example of a time slice display derived from sampled data and a conventional seismic amplitude analysis method.
Figure 4B:
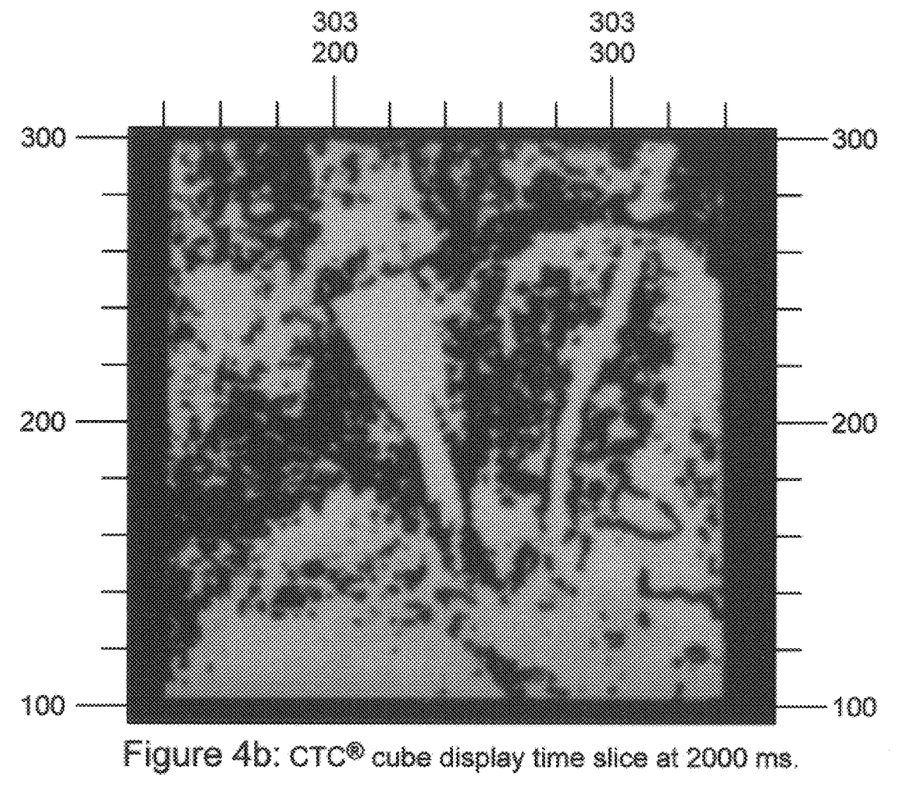
FIG. 4b shows a display example of a cross correlation and "Coherence Cube"® analysis method using the same sampled data.
Figure 4C:
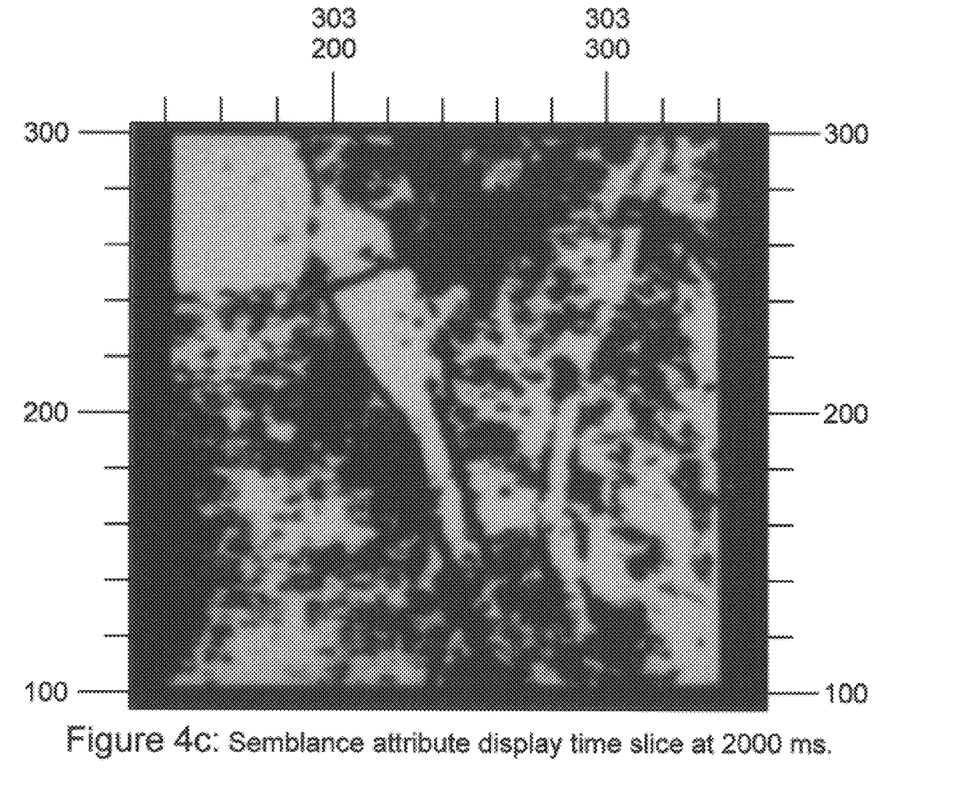
FIG. 4c shows a display example of an inverse semblance attribute analysis method of the invention using the same sampled data.

The results shown in FIGS. 4a, 4b, and 4c compare a conventional or "standard" amplitude slice of seismic data at 2000 ms using SeisWorks® software (shown in FIG. 4a), a 2000 ms time slice display from CTC's "Coherency Cube" application (shown in FIG. 4b), and a display derived from the aforementioned semblance attribute methodology at a 2000 ms time slice display shown in FIG. 4c.

The comparison shows that the semblance attribute produces a sharper image (FIG. 4c) when compared to that from Coherence Technology Corporation's (CTC) "Coherency Cube" application (FIG. 4b) and displaying some discontinuities not readily observable on a conventional time slice (FIG. 4a). In addition, computational time used by the semblance attribute application was significantly less (i.e., at least a ten percent reduction in computational time) than the computational time of a zero mean cross correlation technique similar to that used by the CTC application, e.g., typically at least a 40% reduction, and as much as a 60% reduction or more.

Perhaps more importantly, the semblance attribute process and display has identified structures of interest which prior art discontinuity, "Coherency Cube", and other seismic processing applications have not identified. The degree of coherence can be normalized and theoretically defined as a ratio of the energy of the sum of several traces to the sum of the energies of the individual input traces for a given time. It can be mathematically defined as $$C_{ti} = \frac{\left[\sum_{i-m\Delta i}^{i+m\Delta i} x_{ti}\right]^2}{\left[\sum_{i-m\Delta i}^{i+m\Delta i} (x_{ti})^2\right]}$$

where;

m is the one half the number of samples in the in-line spatial window, and $x_{ti}$ is the amplitude at time t of a contributing trace i.

When the individual input traces are the same or coherent, the degree of coherence value will be large. When the traces are dissimilar or incoherent, the degree of coherence value is small (incoherence). However, the indication of incoherence does not determine what caused the incoherence, e.g., whether it is caused by noise, a change in phase and/or frequency within the data, or a discontinuity caused by faults or a change in geologic structure.

The estimation of semblance (instead of coherence) compares the continuity between adjacent traces and estimates this continuity over a time range. When the semblance attribute is calculated in orthogonal directions, the similarity between seismic wavelet character (the seismic trace over a specified time window) can be compared in more than one spatial dimensions and time which represents a third spatial dimension. Calculating the inverse of the semblance attribute assigns a large number to time and multi-dimensional spatial discontinuities. Since fault planes, channels and rapid changes in geologic structure are typically multi-dimensional (including seismic time representations of depth) while noise and subtle changes in structure are typically one or two dimensional, calculating the continuity and/or inverse semblance attribute in several dimensions (e.g., two orthogonal directions) will enhance identification of these three dimensional changes in seismic character. This allows enhanced visualization of fault planes, channels and significant geologic structural changes.

The semblance attribute is also relatively economical with respect to computing resources. The example discussed above required 11.23 seconds of computing time on an Ultra Sparc 1 computer. This is believed to be only about 10 to 50 percent of the time required to compute a comparable cross-correlation function.

The semblance attribute also allows input data to be in 32, 16 or 8 bit format whereas CTC's application is believed to require input data in 32 bit format only. Data in 16 or 8 bit format offers a 2 to 4 times reduction, respectively, in storage capacity over 32 bit format data.

Other theoretically possible reasons for the differences observed are disclosed by comparing the semblance attribute method of the present invention with the "discontinuity cube"/zero mean lagged cross-correlation methods disclosed in U.S. Pat. No. 5,563,949 (the '949 patent). The cross-correlations disclosed in the '949 patent include linear product terms, summations and square root functions and ratios of these terms and functions. It is believed that the ratio of these terms and functions does not diverge as rapidly to indicate the presence of geological structures when compared to the squared functions and ratio of squared functions of the present invention. In other words, the inverse of semblance attribute, especially for multi-dimensional calculations, will theoretically more quickly diverge from unity compared to other prior art cross-correlation or "Coherence Cube" functions when a significant structural discontinuity is present in the seismic volume.

Theoretically possible reasons have been provided to explain differences when an application of the invention is compared with other methods. However, the claims hereinafter set forth are in no way limited by the reasons provided.

While the preferred embodiment of the invention has been shown and described, and some alternative embodiments also shown and/or described, changes and modifications may be made thereto without departing from the invention. Accordingly, it is intended to embrace within the invention all such changes, modifications and alternative embodiments as fall within the spirit and scope of the appended claims.

What is claimed is:

1. A method of locating a subsurface geologic structure indicating a recoverable natural resource in an underground volume, said method comprising:
   obtaining 3D seismic data traversing at least a portion of said underground volume;
   calculating a semblance attribute within a windowed portion of said 3D seismic data wherein said semblance attribute calculation is dependent at least in part on windowed seismic samples displaced in an in-line spatial direction, windowed seismic samples displaced in a cross-line spatial direction, the number of said in-line seismic samples, and the number of said cross-line seismic samples;
   displaying a representation of said structure, wherein said representation is dependent at least in part on said semblance attribute; and
   drilling a well capable of recovering at least a portion of said natural resource.

2. The method of claim 1 wherein said semblance attribute, is dependent at least in part on the square of the sum of the amplitudes of seismic traces within said windowed data and the sum of the squared amplitudes of each of said seismic traces.

3. The method of claim 2 wherein said square of the summed amplitudes and the sum of the squared amplitudes are summed over time.

4. The method of claim 3 wherein said semblance attribute at time t and spatial location trace i, and line j, $S_{tij}$, is given by $$S_{tij} = \frac{\sum_{t-n\Delta t}^{t+n\Delta t}\left[\sum_{i-m\Delta i}^{i+m\Delta i}\sum_{j-p\Delta j}^{j+p\Delta j} x_{tij}\right]^2}{\sum_{t-n\Delta t}^{t+n\Delta t}\left[\sum_{i-m\Delta i}^{i+m\Delta i}\sum_{j-p\Delta j}^{j+p\Delta j} (x_{tij})^2\right]}$$

where;
   n is one half the number of samples in the semblance time window
   m is the one half the number of samples in the in-line spatial window
   p is one half the number of samples in the cross-line spatial window, and
   $x_{tij}$ is the amplitude at time t of a contributing trace at spatial location i, j.

5. The method of claim 4 wherein said semblance attribute is not dependent upon a zero mean lagged cross-correlation function.

6. The method of claim 5 wherein said calculation is accomplished in significantly less time when compared to calculations based on a zero mean lagged cross-correlation function.

7. A method of locating an underground structure comprising the steps of:
   a) generating a plurality of seismic signals covering at least a portion of said structure;
   b) obtaining 3D seismic data covering said structure portion;
   c) selecting spatial and time windows of said 3D seismic data forming a seismic window; and
   d) measuring a semblance attribute for said seismic window of seismic data wherein said semblance attribute is dependent at least in part on windowed seismic samples substantially displaced in an in-line spatial direction, windowed seismic samples substantially displaced in a cross-line spatial direction, the number of in-line seismic samples in said seismic window, and the number of cross-line seismic samples in said seismic window.

8. The method of claim 7 wherein said semblance attribute is calculated at least in part using the number of seismic samples within a time window.

9. The method of claim 7 wherein said semblance attribute is calculated in the absence of a correlation to a dip or a dip azimuth.

10. The method of claim 8 which also comprises the following step;
    e) calculating a inverse of said semblance attribute.

11. The method of claim 10 which also comprises the following step:
    f) displaying said seismic data using said semblance attribute to form a visualization of said underground structure.

12. The method of claim 11 wherein said visualization is a two dimensional visualization.

13. The method of claim 11 wherein said visualization is a three dimensional visualization.

14. The method of claim 11 wherein said 3D seismic data is derived from bins arranged in at least a 3 point spatial pattern.

15. The method of claim 14 wherein said 3 point spatial pattern is substantially located in two orthogonal planes.

16. The method of claim 15 wherein said semblance attribute is dependent at least in part on the square of the sum of trace amplitudes within a window of said seismic data and the sum of the squared trace amplitudes of said seismic data over a similar window.

17. The method of claim 16 wherein said semblance attribute at time t and spatial location trace i and line j, $S_{tij}$, is given by $$S_{tij} = \frac{\sum_{t-n\Delta t}^{t+n\Delta t}\left[\sum_{i-m\Delta i}^{i+m\Delta i}\sum_{j-p\Delta j}^{j+p\Delta j} x_{tij}\right]^2}{\sum_{t-n\Delta t}^{t+n\Delta t}\left[\sum_{i-m\Delta i}^{i+m\Delta i}\sum_{j-p\Delta j}^{j+p\Delta j} (x_{tij})^2\right]}$$

where;

n is one half the number of samples in the semblance time window m is the one half the number of samples in the in-line spatial window p is one half the number of samples in the cross-line spatial window, and $x_{tij}$ is the amplitude at time t of a contributing trace at spatial location i, j.

18. An apparatus for locating an underground structure comprising:

a seismic pulse generator;

means for obtaining 3D seismic data covering at least a portion of said structure;

means for selecting a spatial and time window of said seismic data forming a seismic volume; and means for calculating a semblance attribute for portions of said seismic data wherein said semblance attribute is dependent at least in part on seismic samples within a window displaced in an in-line spatial direction, seismic samples within said window displaced in a cross-line spatial direction, the number of in-line seismic samples in said window, and the number of cross-line seismic samples in said window.

19. The apparatus of claim 18 wherein said means for measuring and said means for selecting comprise a computer.

20. An apparatus for locating an underground structure comprising:

a plurality of seismic signal receivers; and a computer capable of forming a seismic volume and measuring a semblance attribute.

* * * * *